US012600873B2

(12) United States Patent
Ji et al.

(10) Patent No.: US 12,600,873 B2
(45) Date of Patent: Apr. 14, 2026

(54) PIGMENT COMPOSITION, PRINTING INK, AND METHOD FOR MANUFACTURING PIGMENT COMPOSITION

(71) Applicant: DIC Corporation, Tokyo (JP)

(72) Inventors: Shumei Ji, Qingdao (CN); Issei Masuko, Kamisu (JP); Masaki Hosaka, Kamisu (JP); Kyoichi Okada, Kamisu (JP); Nagatoshi Kobayashi, Kamisu (JP); Xiyang Liao, Qingdao (CN); Wei Zhao, Qingdao (CN)

(73) Assignee: DIC CORPORATION, Tokyo (JP)

( * ) Notice: Subject to any disclaimer, the term of this patent is extended or adjusted under 35 U.S.C. 154(b) by 552 days.

(21) Appl. No.: 18/009,403

(22) PCT Filed: Jun. 28, 2020

(86) PCT No.: PCT/CN2020/098546
§ 371 (c)(1),
(2) Date: Dec. 9, 2022

(87) PCT Pub. No.: WO2022/000130
PCT Pub. Date: Jan. 6, 2022

(65) Prior Publication Data
US 2023/0312948 A1 Oct. 5, 2023

(51) Int. Cl.
C09D 11/037 (2014.01)
C09B 67/20 (2006.01)
C09B 67/46 (2006.01)
C09D 11/102 (2014.01)
C09D 17/00 (2006.01)
C09D 171/02 (2006.01)

(52) U.S. Cl.
CPC ........ C09D 11/037 (2013.01); C09B 67/0066 (2013.01); C09B 67/009 (2013.01); C09D 11/102 (2013.01); C09D 17/003 (2013.01); C09D 171/02 (2013.01)

(58) Field of Classification Search
CPC .. C09D 11/037; C09D 11/102; C09D 17/003; C09D 171/02; C09D 11/03; C09B 67/0066; C09B 67/009
See application file for complete search history.

(56) References Cited

U.S. PATENT DOCUMENTS 7,262,284 B2 * 8/2007 Schupp ................. C09B 33/153
534/740
2015/0000566 A1 * 1/2015 Ahrens ................. C09B 67/009
106/480
2018/0362769 A1 12/2018 Devreux et al.

FOREIGN PATENT DOCUMENTS

CN 1569968 A 1/2005
EP 2343343 A1 7/2011
JP 2019-502799 A 1/2019
WO WO-2006059741 A1 * 6/2006 ........... C09B 41/001

OTHER PUBLICATIONS

International Search Report dated Apr. 1, 2021, issued in counterpart International Application No. PCT/CN2020/098546 (3 pages).
Notice of Reasons for Refusal dated Jul. 26, 2022, issued in counterpart JP Patent Application No. 2021-536689, w/ English translation (5 pages).

* cited by examiner

Primary Examiner — Doris L Lee
(74) Attorney, Agent, or Firm — WHDA, LLP

(57) ABSTRACT

The issue of the present invention is to provide a disazo pigment in which the polychlorinated biphenyl (PCB) content in addition to the primary aromatic amine (PAA) content is reduced. The present invention provides a pigment composition containing a disazo pigment, an alkylamine that has an alkyl group having a carbon number of 8 or more, and a poly(oxyethylene) alkyl ester that has an alkyl group having a carbon number of 8 or more. Preferably, the disazo pigment includes at least one disazo pigment selected from a group consisting of C.I. Pigment Yellow 83, C.I. Pigment Yellow 13, and C.I. Pigment Yellow 14.

8 Claims, No Drawings

1

PIGMENT COMPOSITION, PRINTING INK, AND METHOD FOR MANUFACTURING PIGMENT COMPOSITION

TECHNICAL FIELD

The present invention relates to a pigment composition containing a disazo pigment, a printing ink containing the pigment composition, and a method for manufacturing the pigment composition.

BACKGROUND ART

Regarding process inks for offset printing, gravure printing, and the like, a yellow ink is important in addition to a magenta ink and a cyan ink. Disazo pigments having excellent coloring power, transparency, hue, chroma, and the like are frequently used as yellow pigments for such a yellow ink.

Some disazo pigments contain a polychlorinated biphenyl (PCB) and a primary aromatic amine (PAA) as residues of raw materials or decomposition products. Such disazo pigments containing these chemical substances are regulated due to concerns about safety in accordance with their use. In particular, in the food packaging field, there is a concern that these harmful chemical substances may pass through a packaging material or may transfer from the packaging material to contents such as food due to permeation, leaching, or the like.

As a method for reducing the PAA, a method described in PTL 1 below is known. In PTL 1, the PAA content is reduced by derivative formation or encapsulation of the PAA remaining in an azo pigment slurry.

CITATION LIST

Patent Literature

[PTL 1]
Japanese Unexamined Patent Application Publication (Translation of PCT Application) No. 2019-502799

SUMMARY OF INVENTION

Technical Problem

As described above, a method for reducing the PAA is known. However, a method for reducing the PCB in addition to the PAA is not known. An issue of the present invention is to provide a disazo pigment in which the PCB content in addition to the PAA content is reduced.

Solution to Problem

The present inventors performed research on the mechanism of generation of a PAA and a PCB in a disazo pigment. As a result, it was found that the PCB content in addition to the PAA content can be reduced by using a specific alkylamine and poly(oxyethylene) alkyl ester combination during a synthesis process of the disazo pigment, and the present invention was realized.

The detailed mechanism in the present invention is conjectured to be as described below. The disazo pigment is synthesized by a reaction between a tetrazo and a coupler. The tetrazo is generated from an amine. Since the tetrazo is unstable, if the tetrazo is not reacted with the coupler immediately after being generated, the tetrazo decomposes, and tetrazo decomposition products are generated. The tetrazo decomposition products do not react with the coupler, and residual coupler increases in amount. The tetrazo decomposition products and the residual coupler cause generation of a PCB or a PAA. In this regard, the dispersibility of the coupler in a reaction solution has a significant effect on the reaction rate of the tetrazo. In the case in which the dispersibility of the coupler is poor, since the amount of dissolution in the reaction solution decreases, the reaction rate of the tetrazo is reduced. Meanwhile, it is conjectured that the dispersibility of the coupler may be improved by including a specific amphipathic alkylamine having a hydrophilic group and a hydrophobic group and a poly(oxyethylene) alkyl ester. In particular, the alkylamine improves wettability and deflocculates aggregates of the coupler. Meanwhile, the poly(oxyethylene) alkyl ester stabilizes dispersed particles of the deflocculated coupler. It is conjectured that using the two in combination enables the dispersibility to be improved to a great extent.

The present invention relates to the following.

Item 1. A pigment composition including a disazo pigment, an alkylamine that has an alkyl group having a carbon number of 8 or more, and a poly(oxyethylene) alkyl ester that has an alkyl group having a carbon number of 8 or more.

Item 2. The pigment composition according to item 1, wherein the disazo pigment includes at least one disazo pigment selected from a group consisting of C.I. Pigment Yellow 83, C.I. Pigment Yellow 13, and C.I. Pigment Yellow 14.

Item 3. The pigment composition according to item 1 or item 2, wherein the poly(oxyethylene) alkyl ester content is 1.0% to 8.0% by mass relative to the total amount of the pigment composition.

Item 4. A pigment composition according to any one of items 1 to 3, wherein the alkylamine is octadecylamine or N,N-dimethyloctadecylamine.

Item 5. A printing ink containing the pigment composition according to any one of items 1 to 4.

Item 6. A method for manufacturing a pigment composition, including obtaining a pigment composition containing a disazo pigment by subjecting a diazo component and a coupler component to a coupling reaction in the presence of an alkylamine that has an alkyl group having a carbon number of 8 or more and a poly(oxyethylene) alkyl ester that has an alkyl group having a carbon number of 8 or more.

Advantageous Effects of Invention

According to the present invention, a disazo pigment composition in which the PCB content in addition to the PAA content is very low can be obtained. Therefore, the pigment composition according to the present invention is particularly useful for printing inks that are applied in fields of food packaging film and the like.

DESCRIPTION OF EMBODIMENTS

The present invention will be described below in detail.
[Pigment Composition]
A pigment composition according to the present invention includes a disazo pigment, an alkylamine that has an alkyl group having a carbon number of 8 or more, and a poly(oxyethylene) alkyl ester (POE alkyl ester) that has an alkyl group having a carbon number of 8 or more. The pigment composition according to the present invention is particularly useful for the printing inks, as described above, and may be used for, for example, applications other than printing inks, such as paints and plastic coloring.

Examples of the disazo pigment include C.I. Pigment Yellow 12, 13, 14, 17, 55, 81, 83, 87, 124, 126, and 152. Of these, at least one of C.I. Pigment Yellow 83, C.I. Pigment Yellow 13, and C.I. Pigment Yellow 14 is preferable as the disazo pigment. These disazo pigments may be used alone, or at least two types may be used in combination.

The carbon number of the alkyl group in the above-described alkylamine is 8 or more, the carbon number is preferably 10 to 30, and the carbon number is more preferably 12 to 20. It is conjectured that the carbon number being within the above-described range enables sufficient hydrophobicity to be obtained and, thereby, enables dispersibility of the coupler to be improved during the synthesis process of the disazo pigment. The alkylamine may be any one of a primary amine, a secondary amine, and a tertiary amine. Meanwhile, the alkylamine may be a straight chain or may have a branched chain. From the viewpoint of obtaining sufficient hydrophobicity, it is preferable that a straight chain having a carbon number of 8 or more be included.

Examples of the alkylamine include octylamine, nonylamine, decylamine, undecylamine, dodecylamine, tridecylamine, tetradecylamine, pentadecylamine, hexadecylamine, heptadecylamine, octadecylamine, nonadecylamine, icosylamine, eicosylamine, heneicosylamine, docosylamine, tricosylamine, tetracosylamine, and N,N-dimethyloctadecylamine. Of these, octadecylamine and N,N-dimethyloctadecylamine are preferable as the alkylamine because of ease of availability and a high effect of improving coupler dispersibility.

The HLB value of the alkylamine is 0.4 to 8.0, preferably 0.6 to 6.0, and more preferably 1.0 to 5.0. The HLB value being within the above-described range enables favorable coupler dispersibility to be obtained.

In this regard, the HLB value used in the surfactant field indicates the balance between the hydrophilic portion and the hydrophobic portion (hydrophile-lipophile balance) of the molecule and takes on a value of 0 to 20, and it can be said that a material having a higher HLB value exhibits higher hydrophilicity. In the present invention, the HLB value denoted by Griffin's equation is used unless otherwise specified (the same applies hereafter).

Regarding such an alkylamine, commercially available products may be used, and, for example, LIPOMIN 18D (trade name; produced by Lion Specialty Chemicals Co., Ltd.) may be used. These alkylamines may be used alone, or at least two types may be used in combination.

It is conjectured that even a small amount of the above-described alkylamine can improve the dispersibility of the coupler. As a result, the PCB and the PAA may be suppressed from being generated, and there is no particular limitation regarding the alkylamine content.

The above-described POE alkyl ester is an amphipathic nonionic surfactant having a hydrophilic polyoxyethylene (POE) group and a hydrophobic alkyl group. The POE alkyl ester may be a mixture containing at least two compounds that differ from each other in the degree of polymerization of the POE and the number of alkyl chains.

The carbon number of the alkyl group in the POE alkyl ester is 8 or more, the carbon number is preferably 10 to 30, and the carbon number is more preferably 12 to 20. It is conjectured that the carbon number being within the above-described range enables sufficient hydrophobicity to be obtained and, thereby, enables dispersibility of the coupler to be improved during the synthesis process of the disazo pigment. Meanwhile, the degree of polymerization of the POE in the POE alkyl ester is preferably 2 to 30.

Examples of the POE alkyl ester include polyethylene glycol ricinoleic acid ester (PEG ricinoleic acid ester), polyethylene glycol ricinoleic acid ester triglyceride (PEG ricinoleic acid ester triglyceride), polyethylene glycol monostearic acid ester, polyethylene glycol monooleic acid ester, polyethylene glycol monoisostearic acid ester, polyethylene glycol dilauric acid ester, polyethylene glycol distearic acid ester, polyethylene glycol dioleic acid ester, and polyethylene glycol diisostearic acid ester.

The HLB value of the POE alkyl ester is 11.0 to 16.0, preferably 12.0 to 15.0, and more preferably 12.5 to 14.5. The HLB value being within the above-described range enables favorable coupler dispersibility to be obtained.

Regarding such a POE alkyl ester, commercially available products may be used, and, for example, DISPERBYK-192 (catalog name; produced by BYK-Chemie GmbH) and EL-40 (produced by JIANGSU HAI'AN PETROCHEMICAL) may be used. These POE alkyl esters may be used alone, or at least two types may be used in combination.

The POE alkyl ester content is, for example, 0.5 to 10.0 parts by mass, preferably 1.0 to 8.0 parts by mass, and more preferably 1.5 to 6.0 parts by mass relative to 100 parts by mass of the disazo pigment. It is conjectured that the content being within the above-described range enables dispersibility of the coupler to be improved during synthesis of the disazo pigment. As a result, the PCB and the PAA may be suppressed from being generated.

The pigment composition according to the present invention may contain pigments other than the disazo pigment. Examples of the yellow pigment (in particular, azo-based yellow pigment) other than the disazo pigment include C.I. Pigment Yellow 1, 3, 10, 65, 74, 93, 94, 95, 97, 98, 109, 110, 151, 154, 155, 167, and 180. In addition, pigments other than yellow pigments, for example, orange, crimson, purple, blue, green, and white pigments and extender pigments, may be contained in accordance with the hue when an ink is produced.

As the situation demands, pigment derivatives (synergists) may be used for the pigment composition according to the present invention. Examples of the pigment derivative include pigment derivatives in which the above-described organic pigment serves as a skeleton and in which a substituent is added to the skeleton of the pigment. Specifically, azo-based pigment derivatives, disazo-based pigment derivatives, azomethine-based pigment derivatives, anthraquinone-based pigment derivatives, quinophthalone-based pigment derivatives, benzimidazolone-based pigment derivatives, isoindoline-based pigment derivatives, quinacridone-based pigment derivatives, and perinone-based pigment derivatives may be used. Examples of the derivative portion include a hydroxy group, a carboxylic acid group, and a sulfonic acid group. At least two different types of these pigment derivatives may be used in combination.

The PAA content of the pigment composition according to the present invention is preferably, for example, 700 ppm or less and more preferably 600 ppm or less. Meanwhile, the PCB content is preferably, for example, 25 ppm or less and more preferably 15 ppm or less.

The pigment composition according to the present invention may be obtained, following a common method, by subjecting a tetrazo component and a coupler component to a coupling reaction in the presence of the alkylamine and the POE alkyl ester so as to synthesize a disazo pigment. In this regard, the alkylamine and the POE alkyl ester remain in the pigment composition after synthesis of the disazo pigment. However, these residues can be removed by performing washing or the like as the situation demands.

In the case in which the disazo pigment is, for example, C.I. Pigment Yellow 14, a 3,3'-dichlorobenzidine tetrazonium salt is used as the tetrazo component, 2'-methylacetoacetanilide is used as the coupler component, and a pigment composition is obtained by performing the coupling reaction in the presence of the alkylamine and the POE alkyl ester. Meanwhile, in the case in which the disazo pigment is, for example, C.I. Pigment Yellow 83, a 3,3'-dichlorobenzidine tetrazonium salt is used as the tetrazo component, 4'-chloro-2',5'-dimethoxyacetoacetanilide is used as the coupler component, and a pigment composition is obtained by performing the coupling reaction in the presence of the alkylamine and the POE alkyl ester. In the cases of disazo pigments other than the above, pigment compositions are obtained by performing synthesis in the same manner.

The above-described coupling reaction may be performed by, for example, the method described below.

A tetrazo component aqueous solution is prepared by adding 3,3'-dichlorobenzidine dihydrochloride to water and further adding hydrochloric acid and sodium nitrite so as to cause tetrazotization. Meanwhile, a coupler component aqueous solution is prepared by dispersing a compound serving as a coupler in water and adding a sodium hydroxide aqueous solution or the like so as to cause dissolution. Subsequently, water is placed in a separately prepared coupling reaction container, and an alkylamine and a POE alkyl ester are added to and dissolved in the water. Thereafter, a tetrazo component aqueous solution is placed in the container, and a coupler component aqueous solution is dripped so as to cause a coupling reaction.

As the situation demands, the pH of each of the tetrazo component aqueous solution and the coupler component aqueous solution may be adjusted by adding an aqueous solution of sodium hydroxide, potassium hydroxide, or the like. The tetrazo component and the coupler component in the form of a powder instead of the form of an aqueous solution may be added. Regarding the pigment composition according to the present invention, it is preferable that addition be performed in the above-described order, but there is no particular limitation regarding the order of addition.

[Printing Ink]

The printing ink according to the present invention contains the pigment composition according to the present invention, a resin for dispersing and stabilizing the pigment, a solvent serving as a dispersion medium, and additives required for the printing ink. The printing ink according to the present invention may be any one of a letterpress (flexographic) ink, an intaglio (gravure) ink, and a lithographic (offset) ink. Meanwhile, the printing ink according to the present invention may an active-energy-ray-curable ink in which a photo-curable compound or a photopolymerization initiator is included.

As the situation demands, the printing ink according to present invention may contain, in addition to the above, commonly usable additives, for example, organic or inorganic fillers, solvents, resins, rosin compounds, polymerization inhibitors, sensitizers, antistatic agents, debubbling agents, surfactants, viscosity adjusters, lightfastness stabilizers, weatherability stabilizers, thermal stabilizers, ultraviolet absorbers, antioxidants, leveling agents, plasticizers, pigment dispersing agents, and waxes. In addition, as the situation demands, the printing ink according to the present invention may contain vegetable oils or vegetable-oil-derivative fatty acid esters.

The printing ink according to the present invention may be obtained, following the common method, for example, by adding the above-described resin, solvent, additive, and the like to the pigment composition according to the present invention and performing kneading. There is no particular limitation regarding the order of addition of the components of the printing ink according to the present invention provided that the effects of the present invention are not impaired. For example, the printing ink may be produced by adding a pigment such as the disazo pigment to the solvent, performing kneading, and adding and dispersing the resin and the additives successively.

EXAMPLES

The present invention will be described below in detail with reference to the examples and the comparative examples. By using the methods shown in the examples and the comparative examples described below, C.I. Pigment Yellow 83 (Y83) and a pigment composition containing the same, C.I. Pigment Yellow 13 (Y13) and a pigment composition containing the same, and C. I. Pigment Yellow 14 (Y14) and a pigment composition containing the same were obtained. The resulting pigment compositions were subjected to quantitative analysis of residual POE alkyl ester and alkylamine by using the method described below. In addition, the content of each of the PAA and the PCB was analyzed in accordance with the quantitative analysis method described below (in Table 1, numerical values in parentheses represent amounts of addition during synthesis). These results are shown in Table 1. In this regard, "%" in the following description represents "% by mass".

Example 1

Tetrazotization was performed in accordance with a common method by using 3,3'-dichlorobenzidine dihydrochloride (DCBH) corresponding to 21.8 g of 3,3'-dichlorobenzidine, 32.4 g of 37% hydrochloric acid, and 31.4 g of 40% sodium nitrite, and 7.6 g of 10% sulfamic acid was added so as to prepare a tetrazonium aqueous solution at 5° C.

Meanwhile, 49.9 g of 4'-chloro-2',5'-dimethoxyacetoacetanilide (AA254A) was dissolved in 48.0 g of 25% sodium hydroxide aqueous solution and 400.0 g of water, and the amount of the solution was adjusted to 500 mL so as to prepare a coupler aqueous solution at 20° C.

A dispersion solution was prepared by placing 0.6 g (amount of addition: 0.8%) of octadecylamine, 5.3 g of acetic acid, and 100 g of water at 80° C. in a reaction container with an agitator. After 2.2 g (amount of addition: 3.1%) of PEG ricinoleic acid ester was dissolved in 100 g of water at 80° C., the resulting solution was added to the above-described dispersion solution, and the amount of the solution was adjusted to 800 mL. A buffer solution was prepared by adding part of the coupler aqueous solution to the resulting dispersion solution so as to adjust the pH to 5.5 at 20° C.

A tetrazonium aqueous solution was fed over 3 hours at a constant rate into the reaction container in which the buffer solution was prepared. During this time, the coupler aqueous solution was also fed into the reaction container so that the pH in the reaction container became 5.4 to 5.6. In this regard, after the entire coupler aqueous solution was fed, a diluted sodium hydroxide aqueous solution was fed.

After the entire tetrazonium aqueous solution was added, the pH was adjusted to 11.0 by adding a sodium hydroxide aqueous solution, and heating to 90° C. was performed.

Aging was performed at 90° C. for 40 minutes, and cooling to 70° C. was performed. Hydrochloric acid was added so as to adjust the pH to 6.5, and agitation was performed for 10 minutes. Thereafter, filtration, washing, and drying were performed so as to obtain a pigment composition containing Y83.

Example 2

Y83 was synthesized and a pigment composition was obtained in the same manner as in Example 1 except that the amount of the PEG ricinoleic acid ester was set to be 3.3 g (amount of addition: 4.7%).

Example 3

Y83 was synthesized and a pigment composition was obtained in the same manner as in Example 1 except that 3.3 g (amount of addition: 4.7%) of PEG ricinoleic acid ester triglyceride was used instead of the PEG ricinoleic acid ester.

Example 4

Tetrazotization was performed in accordance with a common method by using DCBH corresponding to 25.0 g of 3,3'-dichlorobenzidine, 34.7 g of 37% hydrochloric acid, and 36.8 g of 40% sodium nitrite so as to prepare a tetrazonium aqueous solution at 5° C.

Meanwhile, 57.0 g of AA254A, 42.0 g of 25% sodium hydroxide aqueous solution, and 400.0 g of water were placed in a reaction container with an agitator, and a coupler aqueous solution at 20° C. was prepared.

A dispersion solution was prepared by mixing 4.9 g (amount of addition: 6.0%) of octadecylamine, 39.3 g of acetic acid, and 100 g of water at 80° C. Further, 1.6 g (amount of addition: 2.0%) of PEG ricinoleic acid ester triglyceride was dissolved in 100 g of water at 80° C., and the resulting solution was added to the above-described dispersion solution. The resulting dispersion solution was fed over 30 minutes at a constant rate into the coupler aqueous solution so as to precipitate the coupler. A coupler dispersion solution was prepared by adding a sodium hydroxide aqueous solution so as to adjust the pH to 6.0 at 20° C.

A tetrazonium aqueous solution was fed over 3 hours at a constant rate into the reaction container in which the coupler dispersion solution was prepared.

After the entire tetrazonium aqueous solution was added, the pH was adjusted to 6.0 by adding a sodium hydroxide aqueous solution, and heating to 80° C. was performed. Aging was performed at 80° C. for 1 hour, and cooling to 70° C. was performed. Thereafter, filtration, washing, and drying were performed so as to obtain a pigment composition containing Y83.

Example 5

Tetrazotization was performed in accordance with a common method by using DCBH corresponding to 25.0 g of 3,3'-dichlorobenzidine, 32.4 g of 37% hydrochloric acid, and 35.8 g of 40% sodium nitrite so as to prepare a tetrazonium aqueous solution at 5° C.

Meanwhile, 43.0 g of 2',4'-dimethylacetoacetanilide (AAMX) was dissolved in 50.2 g of 25% sodium hydroxide aqueous solution and 200.0 g of water, and the amount of the solution was adjusted to 300 mL so as to prepare a coupler aqueous solution at 20° C.

A dispersion solution was prepared by placing 4.1 g (amount of addition: 6.0%) of N,N-dimethyloctadecylamine, 3.7 g of acetic acid, and 100 g of water at 80° C. in a reaction container with an agitator. Further, 1.4 g (amount of addition: 2.0%) of PEG ricinoleic acid ester triglyceride was dissolved in 100 g of water at 80° C., and the resulting solution was added to the above-described dispersion solution. Thereafter, the amount of the solution was adjusted to 500 mL. Part of the coupler aqueous solution was added to the resulting dispersion solution so as to adjust the pH to 5.0. A buffer solution was prepared by further adding hydrochloric acid so as to adjust the pH to 4.0 at 10° C.

A tetrazonium aqueous solution was fed over 3 hours at a constant rate into the reaction container in which the buffer solution was prepared. During this time, the coupler aqueous solution was also fed into the reaction container so that the pH in the reaction container became 3.9 to 4.1. In this regard, after the entire coupler aqueous solution was fed, a diluted sodium hydroxide aqueous solution was fed.

After the entire tetrazonium aqueous solution was added, the pH was adjusted to 6.0 by adding a sodium hydroxide aqueous solution, and heating to 80° C. was performed. Aging was performed at 80° C. for 2 hours and 30 minutes, and cooling to 70° C. was performed. Thereafter, filtration, washing, and drying were performed so as to obtain a pigment composition containing Y13.

Example 6

Tetrazotization was performed in accordance with a common method by using DCBH corresponding to 25.0 g of 3,3'-dichlorobenzidine, 32.4 g of 37% hydrochloric acid, and 35.8 g of 40% sodium nitrite so as to prepare a tetrazonium aqueous solution at 5° C.

Meanwhile, 40.0 g of 2'-methylacetoacetanilide (AAOT) was dissolved in 50.0 g of 25% sodium hydroxide aqueous solution and 200.0 g of water, and the amount of the solution was adjusted to 300 mL so as to prepare a coupler aqueous solution at 20° C.

A dispersion solution was prepared by placing 3.9 g (amount of addition: 6.0%) of octadecylamine, 3.7 g of acetic acid, and 100 g of water at 80° C. in a reaction container with an agitator. Further, 1.3 g (amount of addition: 2.0%) of PEG ricinoleic acid ester was dissolved in 100 g of water at 80° C., and the resulting solution was added to the above-described dispersion solution. Thereafter, the amount of the solution was adjusted to 500 mL. Part of the coupler aqueous solution was added to the resulting dispersion solution so as to adjust the pH to 5.0. A buffer solution was prepared by further adding hydrochloric acid so as to adjust the pH to 4.0 at 3° C.

A tetrazonium aqueous solution was fed over 3 hours at a constant rate into the reaction container in which the buffer solution was prepared. During this time, the coupler aqueous solution was also fed into the reaction container so that the pH in the reaction container became 3.9 to 4.1. In this regard, after the entire coupler aqueous solution was fed, a diluted sodium hydroxide aqueous solution was fed.

After the entire tetrazonium aqueous solution was added, the pH was adjusted to 6.0 by adding a sodium hydroxide aqueous solution, and heating to 80° C. was performed. Aging was performed at 80° C. for 2 hours and 30 minutes, and cooling to 70° C. was performed. Thereafter, filtration, washing, and drying were performed so as to obtain a pigment composition containing Y14.

Comparative Example 1

Y83 was synthesized and a pigment composition was obtained in the same manner as in Example 1 except that neither the PEG ricinoleic acid ester nor the octadecylamine was added.

Comparative Example 2

Y83 was synthesized and a pigment composition was obtained in the same manner as in Example 1 except that the octadecylamine was not added.

Comparative Example 3

Y83 was synthesized and a pigment composition was obtained in the same manner as in Example 1 except that the PEG ricinoleic acid ester was not added.

Comparative Example 4

Y83 was synthesized and a pigment composition was obtained in the same manner as in Example 4 except that neither the octadecylamine nor the PEG ricinoleic acid ester triglyceride was added.

Comparative Example 5

Y13 was synthesized and a pigment composition was obtained in the same manner as in Example 5 except that neither the N,N-dimethyloctadecylamine nor the PEG ricinoleic acid ester triglyceride was added.

Comparative Example 6

Y14 was synthesized and a pigment composition was obtained in the same manner as in Example 6 except that neither the octadecylamine nor the PEG ricinoleic acid ester was added.

[Quantitative Analysis Method for Alkylamine]

The pigment composition obtained in the example or the comparative example was dissolved in N-methylpyrrolidone, and the solution was filtered so as to produce a sample solution. The molecular weight of the sample solution was detected by using liquid chromatography mass spectrometry (LC/MS) so as to quantify the alkylamine.

[Quantitative Analysis Method for POE Alkyl Ester]

The pigment composition obtained in the example or the comparative example was dispersed in methanol, and the dispersion solution was filtered so as to produce a sample solution. The sample solution was subjected to NMR measurement so as to quantify the POE alkyl ester.

[Quantitative Analysis Method for PCB]

The pigment composition obtained in the example or the comparative example was dispersed in isooctane and concentrated sulfuric acid, and the dispersion solution was filtered and, thereafter, was dehydrated with anhydrous sodium carbonate so as to produce a sample solution. The molecular weight of the sample solution was detected by using gas chromatography mass spectrometry (GC/MS) so as to quantify PCB.

[Quantitative Analysis Method for PAA]

Analysis was performed in conformity with RESOLUTION AP (89)1.

TABLE 1

| | | POE alkyl ester | | Alkylamine | | PCB | PAA |
| | | PEG ricinoleic acid ester | PEG ricinoleic acid ester triglyceride | | N,N-dimethyloctadecylamine | content [ppm] | content [ppm] |
| | Pigment | | | Octadecylamine | | | |
|---|---|---|---|---|---|---|---|
| Example 1 | Y83 | 2.9% (3.1%) | — | <0.04% [quantification lower limit] (0.8%) | — | 13 | 289 |
| Example 2 | Y83 | 4.4% (4.7%) | — | <0.04% [quantification lower limit] (0.8%) | — | 2 | 427 |
| Example 3 | Y83 | — | 3.8% (4.7%) | <0.04% [quantification lower limit] (0.8%) | — | 5 | 663 |
| Example 4 | Y83 | — | 1.5% (2.0%) | 0.4% (6.0%) | — | 2 | 214 |
| Example 5 | Y13 | — | 1.3% (2.0%) | — | 3.3% (6.0%) | 1 | 102 |
| Example 6 | Y14 | 1.9% (2.0%) | — | 0.4% (6.0%) | — | 2 | 151 |
| Comparative example 1 | Y83 | — | — | — | — | 58 | 754 |
| Comparative example 2 | Y83 | 2.9% (3.1%) | — | — | — | 13 | 839 |
| Comparative example 3 | Y83 | — | — | <0.04% [quantification lower limit] (0.8%) | — | 31 | 697 |
| Comparative example 4 | Y83 | — | — | — | — | 317 | 1053 |
| Comparative example 5 | Y13 | — | — | — | — | 5 | 1076 |
| Comparative example 6 | Y14 | — | — | — | — | 10 | 1649 |

Note:
"—" represents no addition, and numerical values in parentheses represent amounts of addition As is clear from Table 1 above, using the POE alkyl ester and the alkylamine in combination during synthesis of the disazo pigment enables the PCB content and the PAA content to be reduced. Regarding the POE alkyl ester and the alkylamine, the reason for the amount of addition during synthesis not entirely remaining in the composition after the synthesis is conjectured to be that outflow occurs during filtration and washing after the synthesis or that detection is difficult because of adsorption in the pigment.

The invention claimed is:

1. A method for manufacturing a pigment composition, comprising:

obtaining a pigment composition containing a disazo pigment by subjecting a diazo component and a coupler component to a coupling reaction in the presence of an alkylamine that has an alkyl group having a carbon number of 8 or more and a poly(oxyethylene) alkyl ester that has an alkyl group having a carbon number of 8 or more.

2. The method for manufacturing a pigment composition according to claim 1, wherein the disazo pigment comprises at least one disazo pigment selected from a group consisting of C.I. Pigment Yellow 83, C.I. Pigment Yellow 13, and C.I. Pigment Yellow 14.

3. The method for manufacturing a pigment composition according to claim 1, wherein the poly(oxyethylene) alkyl ester is selected from the group consisting of polyethylene glycol ricinoleic acid ester, polyethylene glycol ricinoleic acid ester triglyceride, polyethylene glycol monostearic acid ester, polyethylene glycol monooleic acid ester, polyethyl-ene glycol monoisostearic acid ester, polyethylene glycol dilauric acid ester, polyethylene glycol distearic acid ester, polyethylene glycol dioleic acid ester, and polyethylene glycol diisostearic acid ester.

4. The method for manufacturing a pigment composition according to claim 2, wherein the poly(oxyethylene) alkyl ester is selected from the group consisting of polyethylene glycol ricinoleic acid ester, polyethylene glycol ricinoleic acid ester triglyceride, polyethylene glycol monostearic acid ester, polyethylene glycol monooleic acid ester, polyethyl-ene glycol monoisostearic acid ester, polyethylene glycol dilauric acid ester, polyethylene glycol distearic acid ester, polyethylene glycol dioleic acid ester, and polyethylene glycol diisostearic acid ester.

5. The method for manufacturing a pigment composition according to claim 1, wherein the poly(oxyethylene) alkyl ester content is 1.0% to 8.0% by mass relative to the total amount of the pigment composition.

6. The method for manufacturing a pigment composition according to claim 2, wherein the poly(oxyethylene) alkyl ester content is 1.0% to 8.0% by mass relative to the total amount of the pigment composition.

7. The method for manufacturing a pigment composition according to claim 1, wherein the alkylamine is octa-decylamine or N,N-dimethyloctadecylamine.

8. The method for manufacturing a pigment composition according to claim 2, wherein the alkylamine is octa-decylamine or N,N-dimethyloctadecylamine.

* * * * *